(12) United States Patent
Han et al.

(10) Patent No.: US 8,275,425 B2
(45) Date of Patent: Sep. 25, 2012

(54) PORTABLE TERMINAL FOR MULTIMEDIA

(75) Inventors: Dong-Hoon Han, Seoul (KR); Seung-Woo Ahn, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 446 days.

(21) Appl. No.: 12/551,647

(22) Filed: Sep. 1, 2009

(65) Prior Publication Data

US 2010/0075726 A1 Mar. 25, 2010

(30) Foreign Application Priority Data

Sep. 22, 2008 (KR) .................. 10-2008-0092580

(51) Int. Cl.
*H04M 1/00* (2006.01)
(52) U.S. Cl. .............. 455/575.1; 455/575.3; 455/575.4; 455/90.3
(58) Field of Classification Search .............. 455/575.3, 455/575.4, 575.1, 575.2, 575.8, 90.3
See application file for complete search history.

(56) References Cited

U.S. PATENT DOCUMENTS

| | | | |
|---|---|---|---|
| 6,865,406 B2 | 3/2005 | Park | 455/575.3 |
| 7,424,214 B2 * | 9/2008 | Kim et al. | 396/72 |
| 7,620,425 B2 * | 11/2009 | Ju | 455/566 |
| 7,711,397 B2 * | 5/2010 | Kim | 455/575.1 |
| 7,756,554 B2 * | 7/2010 | Jung | 455/575.3 |
| 7,986,982 B2 * | 7/2011 | Li et al. | 455/575.1 |
| 2003/0162560 A1 * | 8/2003 | Kaneko | 455/550 |
| 2005/0212772 A1 * | 9/2005 | Mochizuki et al. | 345/168 |
| 2006/0071451 A1 * | 4/2006 | Cheng | 280/642 |
| 2006/0238440 A1 * | 10/2006 | Kim et al. | 345/1.1 |
| 2006/0256960 A1 * | 11/2006 | Bae et al. | 379/433.11 |
| 2007/0021160 A1 * | 1/2007 | Li | 455/575.4 |
| 2008/0230437 A1 * | 9/2008 | Ou et al. | 206/701 |
| 2008/0318647 A1 * | 12/2008 | Todune | 455/575.4 |
| 2009/0036177 A1 * | 2/2009 | Lee et al. | 455/575.3 |
| 2009/0168369 A1 * | 7/2009 | Barnett | 361/727 |
| 2009/0170572 A1 * | 7/2009 | Kwon | 455/575.3 |

FOREIGN PATENT DOCUMENTS

| | | | | |
|---|---|---|---|---|
| KR | 2005109742 A | * | 11/2005 | |
| KR | 2007012148 A | * | 1/2007 | |
| KR | 2007041264 A | * | 4/2007 | |

* cited by examiner

*Primary Examiner* — Jinsong Hu
*Assistant Examiner* — Magdi Elhag
(74) *Attorney, Agent, or Firm* — Cha & Reiter, LLC

(57) ABSTRACT

A portable device suitable for various multimedia environments includes: a main body; a folder; and a hinge unit mounted on the main body and rotatably connecting the folder to the main body. The hinge unit is slidable on the main body together with the folder. The mode-switching of the portable being provided according to the sliding position of the hinge unit.

18 Claims, 8 Drawing Sheets

PORTABLE TERMINAL FOR MULTIMEDIA

CLAIM OF PRIORITY

This application claims the priority under 35 U.S.C. §119 (a) from an application entitled "Portable Terminal For Multimedia" filed in the Korean Intellectual Property Office on Sep. 22, 2008 and assigned Serial No. 10-2008-0092580, the contents of which are hereby incorporated by reference in its entirety.

BACKGROUND OF THE INVENTION

1. Field of the Invention

The present invention relates to a portable device having a telephone-conversation function and additional enhanced features. More particularly, the present invention relates to a portable device for multimedia suitable for use in various multimedia environments, in particular devices in a music listening mode.

2. Description of the Related Art

Among portable devices, portable communication devices having a telephone-conversation function include cellular phones, personal digital assistants (PDAs), smart phones, or the like, and the type of devices with this function continues to grow. A user may enjoy a variety of wireless communication activities using such portable communication devices. For example, wireless communication includes voice communication, message transmission, file transmission, and image communication. Considering the consumer demand for portability, portable communication devices tend to be compact, slim and lightweight. In addition, high-functioning portable terminals, such as smart phones, are required for multimedia availability and are thus capable of providing a wider variety of service functions.

Conventional portable communication devices may be classified according to their appearance in terms of portability and convenience in use, including user interface (UI) environments, into bar-type, folder-type and sliding type portable devices, which are classifications of their external structure. In particular, folder-type portable devices have become very popular. A folder-type portable device is disclosed in U.S. Pat. No. 6,865,406, commonly assigned to the assignee of the present application and discloses as background material.

Such popularized folder-type portable devices may provide a degree of convenience to a user in a phone mode for voice communication and message transmission. However, such devices are to a large extent inconvenient under an environment of gradually-improved multimedia availability. For example, the conventional folder-type portable device has shortcomings in that it is inconvenient when used in terms of a UI environment such as a game mode, a DMB mode, a music listening mode, a TV viewing mode or the like. In terms of a data input UI environment, a user may feel comfortable when the convenience of key manipulation is provided. In terms of a data output UI environment, the user may feel comfortable when a wide display unit is provided or a display unit is obliquely mounted. The convenience of key manipulation involves precision, simplicity and rapidity in manipulating keys. In addition, a user feels comfortable in viewing displayed images when a wide display unit is provided.

Under various multimedia environments, a number of different modes are provided. Therefore, a portable device should be convenient in mode-switching through key manipulation or other means.

Of course, while it is possible to increase the size of a portable device so as to provide more keys and a large-sized wide display unit in consideration of various multimedia environments, consumers demand that such portable devices must not be large-sized and heavy, and thus being inconvenient to carry.

Accordingly, there is a long-felt need in the art for a portable device that is small and convenient to carry, and is also capable of providing environments suitable for various multimedia functions, in particular, a data input/output environment, and other UI environments convenient for various multimedia modes.

SUMMARY OF THE INVENTION

Accordingly, the present invention provides a portable device for multimedia which is convenient in mode-switching under a multimedia environment providing various operational modes.

In addition, the present invention provides a portable device for multimedia which is convenient in mode-switching to a music listening mode by configuring a folder-type portable device in such a manner that the folder of the portable device is capable of sliding.

In addition, the present invention provides a portable device for multimedia, which is suitable for multimedia user interface (UI) environments.

In addition, the present invention provides a portable device for improved multimedia operation in a data output multimedia environment by configuring a folder-type portable device in such a manner that a display unit is exposed at the time of mode-switching through the sliding of the folder, thereby allowing the visual confirmation of the display unit.

Furthermore, the present invention provides a portable device improved in an acoustic UI environment by configuring a folder-type portable device in such a manner that a speaker is exposed when the portable device is switched to a music listening mode through the sliding of the folder.

According to an exemplary aspect of the present invention, there is provided a portable device for multimedia including: a main body; a folder; and a hinge unit mounted on the main body and rotatably connecting the folder to the main body, the hinge unit sliding on the main body together with the folder, the mode-switching of the portable device being effectuated according to the sliding of the hinge unit.

In the portable device, the mode-switching includes the switching from a standby mode to a music listening mode.

According to another exemplary aspect of the present invention, there is provided a portable device for multimedia including: a main body having a first display unit and a first key manipulation unit on the top surface thereof; a folder having a second display unit on the inner face thereof, the folder being folded or unfolded on the main body, and sliding on the main body, thereby effecting mode-switching; and a hinge unit mounted on the main body and connecting the folder to the main body, the hinge unit sliding on the main body together with the folder in the state in which the folder is facing the main body.

In the portable device according to the present invention, the first display unit is mounted at the side of the hinge unit in the upper area of the top surface of the main body, so that the first display unit is opened or closed depending on the sliding movement of the folder.

The portable device according to the present invention may further include a coupling means between the main body and the hinge unit, wherein the coupling means includes: one or more projections extending downward from the bottom side of the hinge unit; and one or more guide openings formed on the top surface of the main body, the projections being slidably mounted in the guide openings, respectively.

The hinge unit may further include a block, the block being mounted on the upper end of the top surface of the main body after the hinge unit is coupled to the main body, so that the block prevents the hinge unit from getting out from the main body.

The portable device according to the present invention may further include an information input/output unit on the outer face of the folder, wherein the information input/output unit is formed by a touch screen.

According to another exemplary aspect of the present invention, there is provided a portable device for multimedia including: a main body having a display unit on the top surface thereof; a folder, the folder being folded or unfolded on the main body, thereby effecting first mode-switching, and the folder sliding on the main body, thereby effecting second mode-switching, the display unit being opened or closed depending on the sliding movement of the folder; a hinge unit mounted on the main body and connecting the folder to the main body, the hinge unit sliding on the main body together with the folder in the state in which the folder is opposite to the main body; and a coupling means mounted between the main body and the hinge unit so that the coupling means slidably restrains the hinge unit.

In the portable device, the hinge unit includes: a center hinge formed on the folder; a first side hinge coupled to one end of the center hinge by a hinge module, and a second side hinge coupled to the other end of the center hinge by a hinge dummy.

According to still another exemplary aspect of the present invention, there is provided a portable device for multimedia including: a main body having a speaker on the top surface thereof; a folder, being folded or unfolded on the main body, thereby effecting first mode-switching, and the folder being slidable the main body, thereby effecting second mode-switching, the speaker being opened or closed depending on the sliding movement of the folder; a hinge unit mounted on the main body and connecting the folder to the main body, the hinge unit sliding on the main body together with the folder in the state in which the folder faces the main body; and coupling means mounted between the main body and the hinge unit in such that the coupling means slidably restrains the hinge unit.

By the first mode-switching, the portable device is typically switched from a standby mode to a music listening mode, thereby exposing the speaker.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, exemplary embodiments of the present invention will be described with reference to the accompanying drawings.

Figure 1:
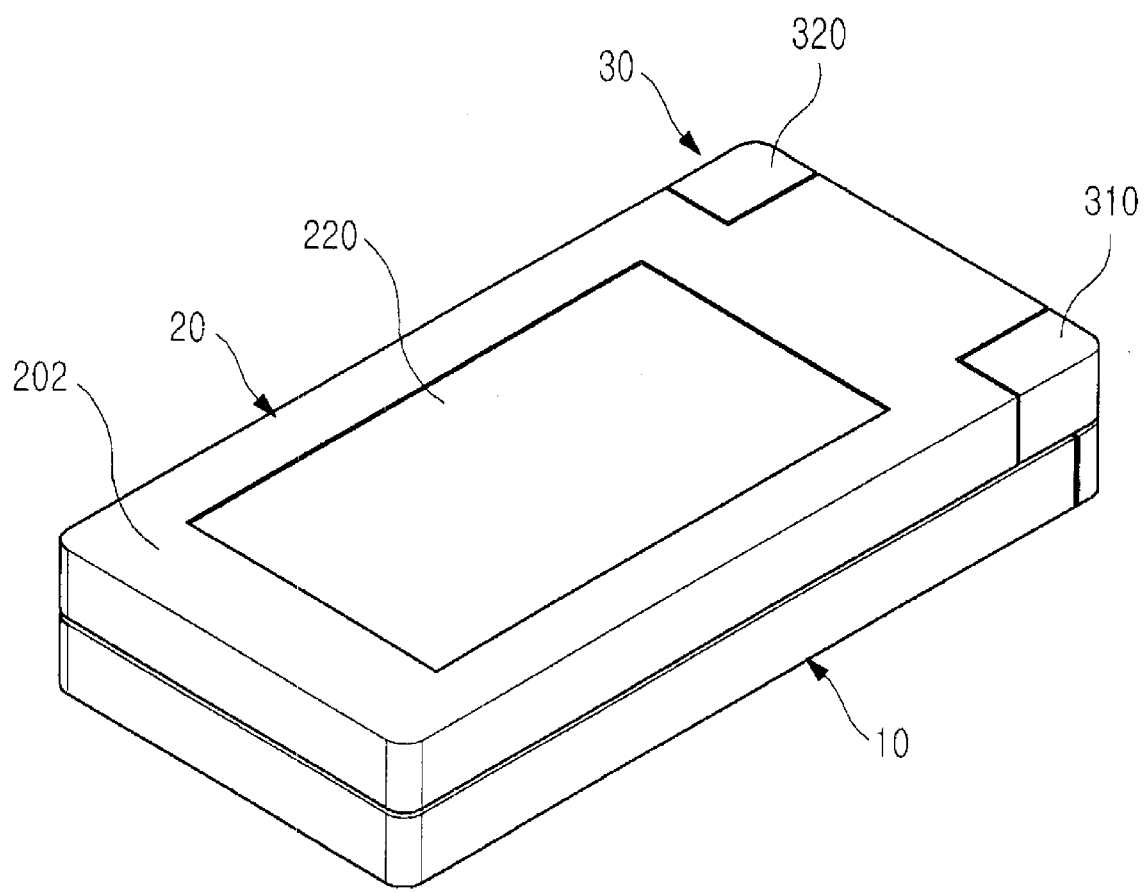
FIG. 1 is a perspective view showing a portable device in accordance with an exemplary embodiment of the present invention, in the state in which a folder is folded.
Figure 2:
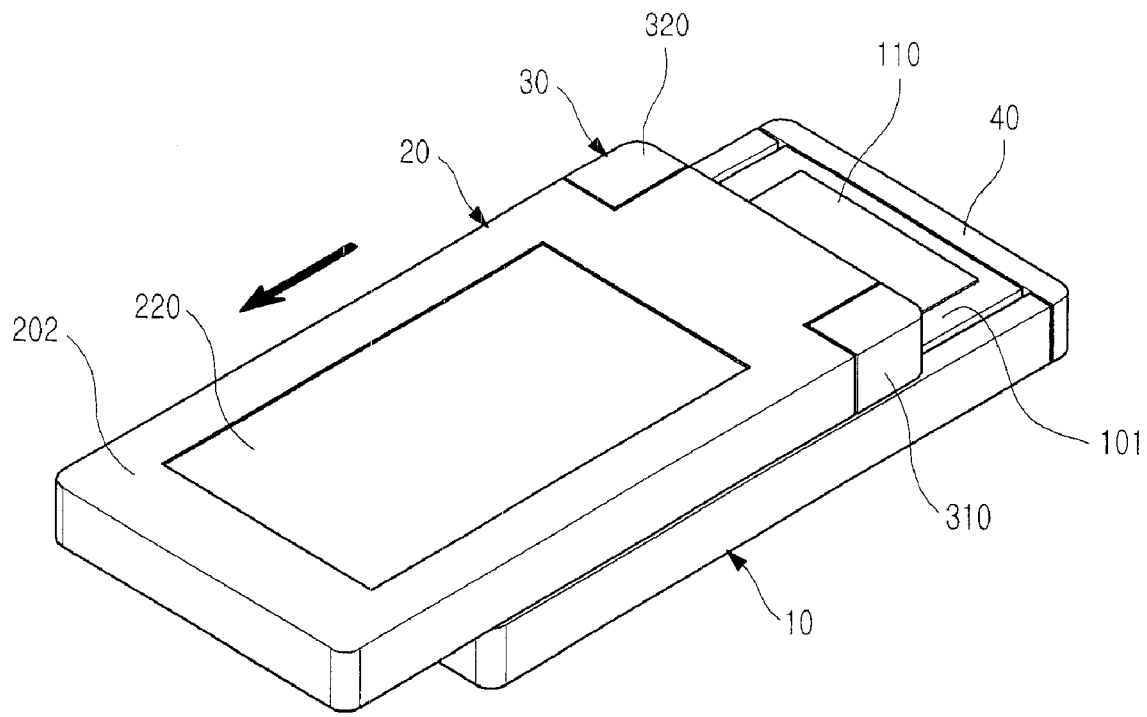
FIG. 2 is a perspective view showing the portable device of FIG. 1, in the state in which the folder is folded.
Figure 3:
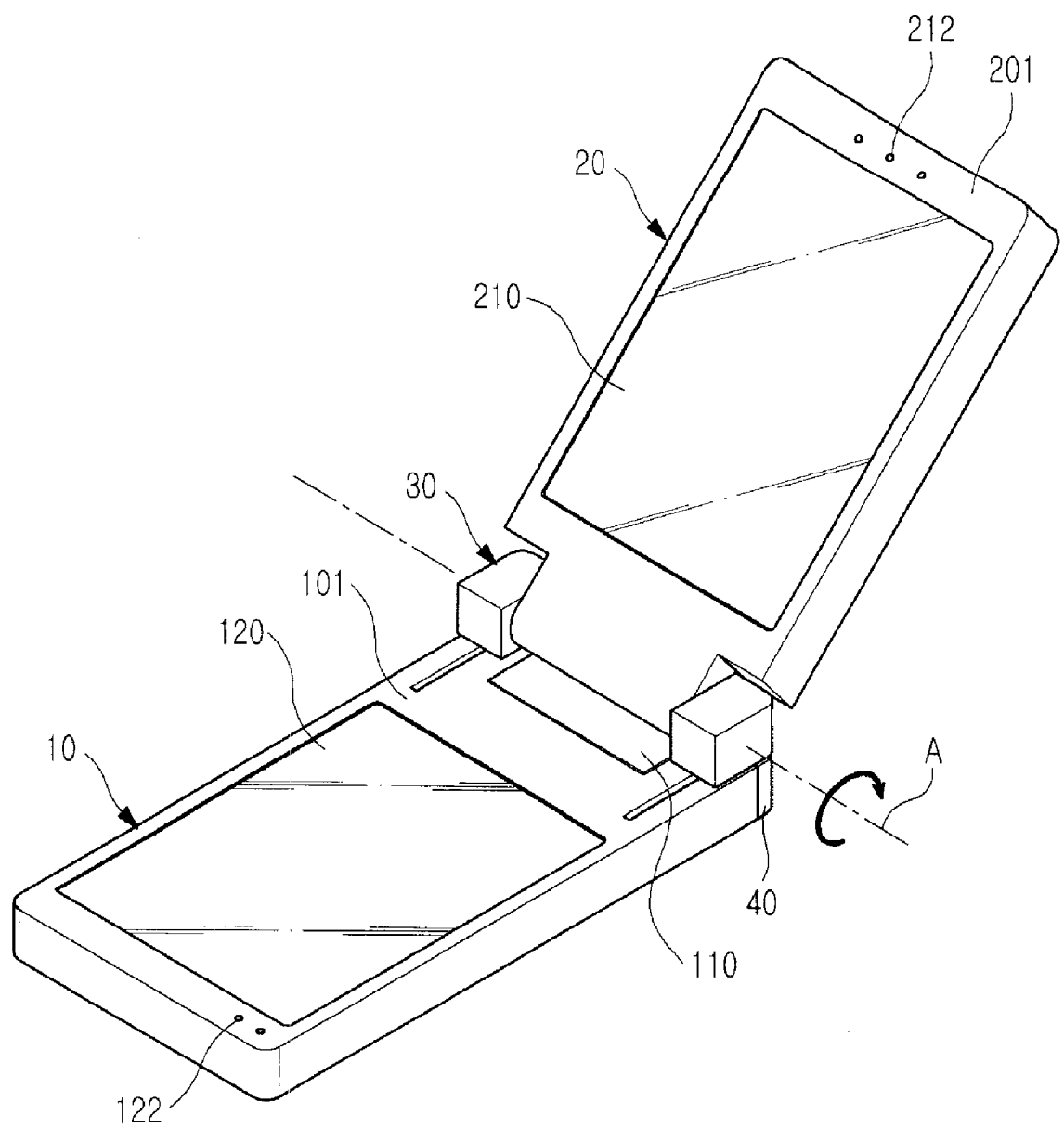
FIG. 3 is a perspective view showing the portable device of FIG. 1, in the state in which the folder is unfolded.

As shown in FIGS. 1 to 3, the portable device in accordance with the present invention includes a main body 10, a folder 20 performing rotating and sliding movements on the main body 10, and a hinge unit 30 connecting the folder 20 to the main body 10. The hinge unit 30 is preferably mounted on the upper area of the top surface 101 (FIG. 3) of the main body 10 so as to allow the folder 20 to be folded or unfolded on the main body 10, and is slid together with the folder 20 on the main body 10 within a predetermined distance in the state in which the folder 20 is faced to the main body 10. In particular, the downward sliding movement of the folder 20 preferably provides mode-switching of the portable device. That is, the portable device 20 is mode-switched from the standby mode, such as shown in FIG. 1 to the music listening mode, such as shown in FIG. 2. However, the present invention is not limited to the mode-switching to the music listening mode, and various other modes can be employed and variations on sliding movement for their activation.

As shown in the examples in FIGS. 2 and 3, a first display unit 110 and a key manipulation unit 120 are provided on the top surface 101 of the main body 10, wherein the first display unit 110 is disposed in the area where the hinge unit 30 is mounted, and the first key manipulation unit 10 is disposed in the lower area of the top surface 101. The first display unit 110 may comprise, for example, any type of LCD, OLED an AM OLED just to name a few non-limiting possibilities. The first key manipulation unit 120 may comprise, for example, a key pad which allows the inputting of information by pushing individual keys, or a touch screen which allows the inputting of information by touching the screen, just to name some non-limiting examples.

As shown in FIGS. 1 and 3, the folder 20 is provided with a second display unit 210 on its inner surface thereof, and an information input/output unit 220 on its outer surface. The second display unit 210 may comprise any type of LCD, OLED an AM OLED just to name a few non-limiting possibilities. In the closed condition as shown in FIG. 1, the second unit 210 is shielded from access by the folder 20, and exposed for access in the rotated condition as shown in FIG. 3, allowing the confirmation of displayed information. The information input/output unit may be configured as a device for inputting desired data and for displaying input data.

For example, if a user inputs desired data through the information input/output unit 220 in the condition shown in FIG. 2, the input information is displayed on the first display unit 110, so that it can be visually confirmed. Reference numeral 122 indicates a microphone device, and reference numeral 212 indicates a speaker device.

Figure 4:
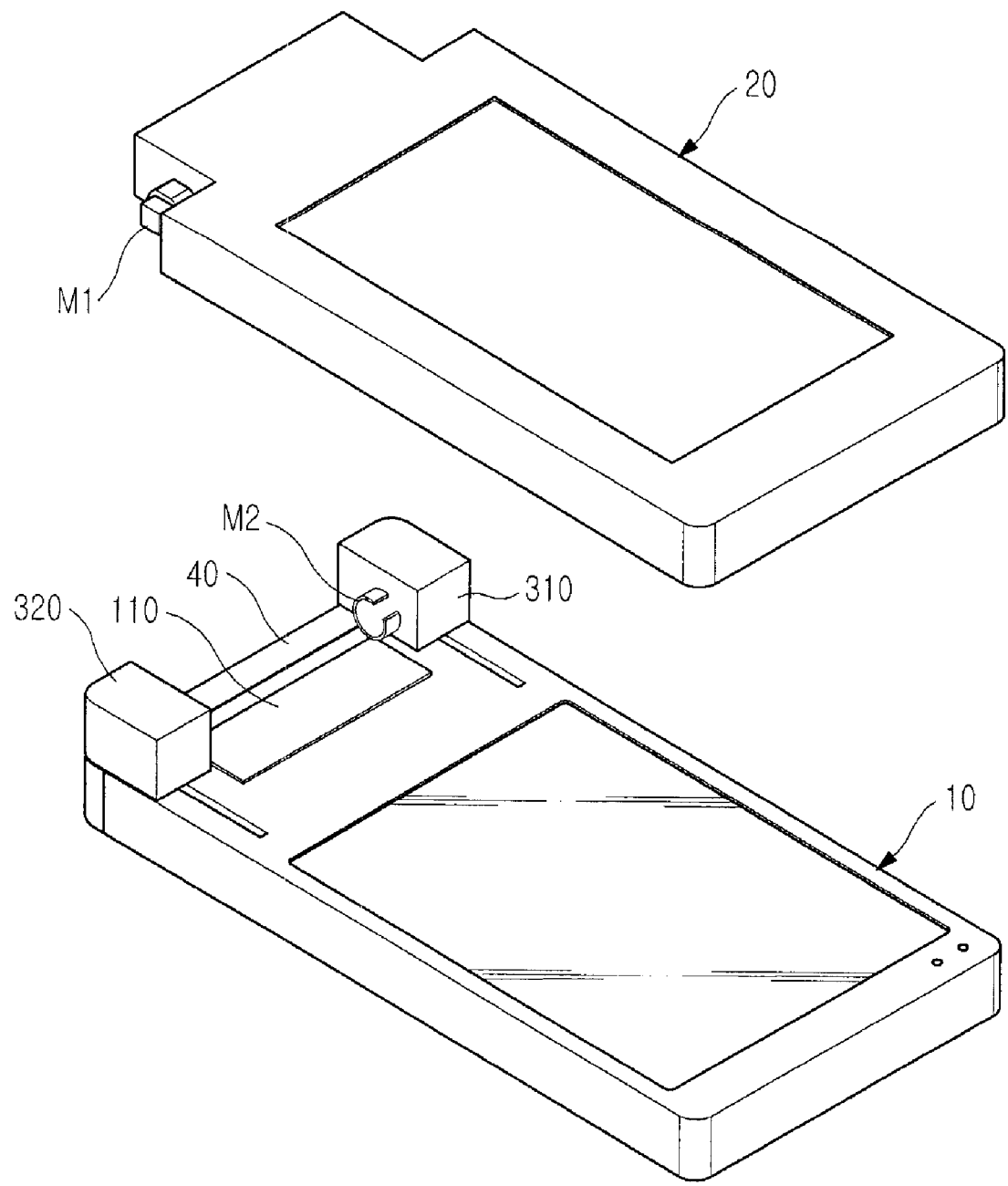
FIG. 4 is a perspective view showing the portable device of FIG. 1, in the state in which the folder is separated from the main body of the portable device.
Figure 5:
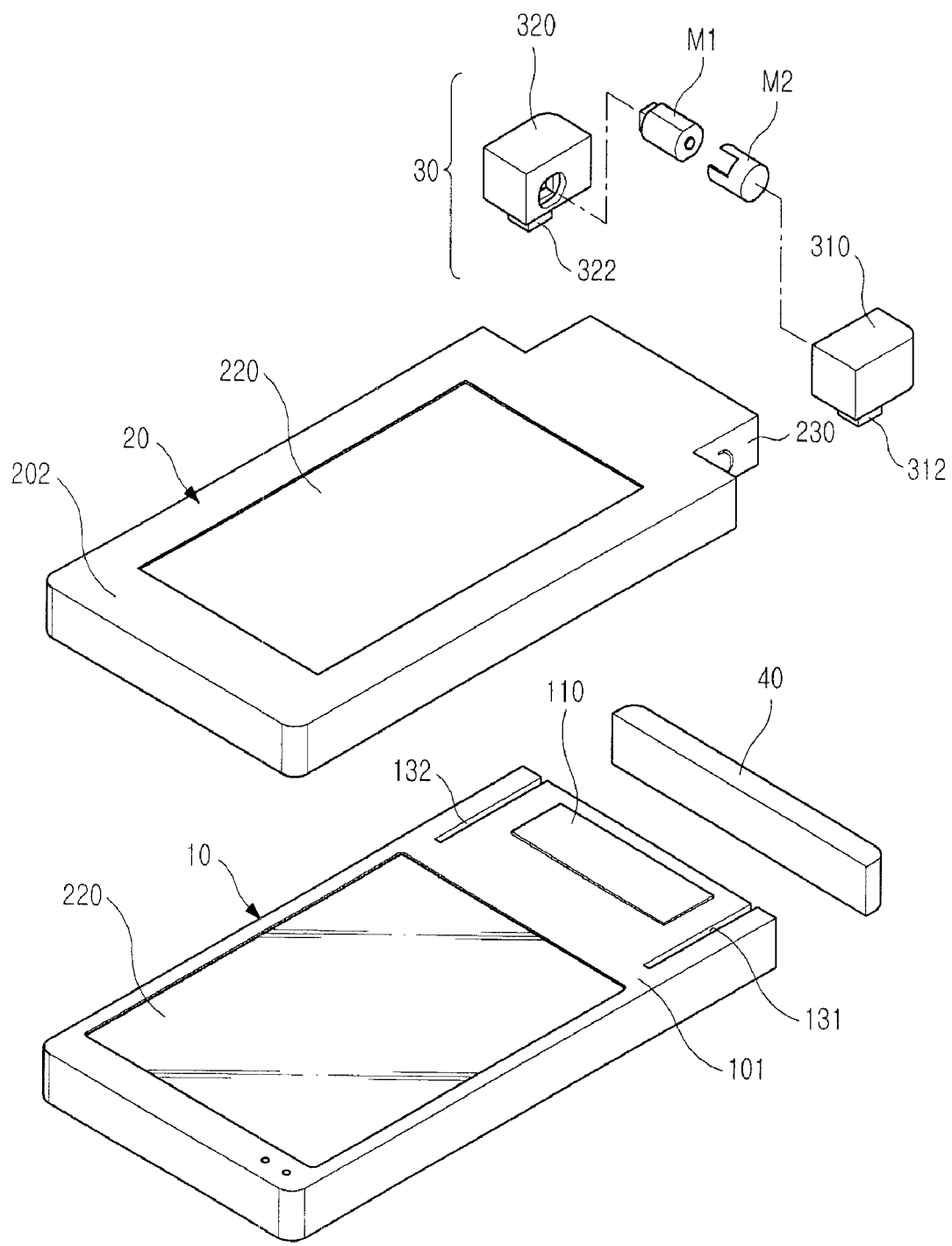
FIG. 5 is an exploded perspective view of the portable device of FIG. 1.

As shown in the examples in FIGS. 4 and 5, the hinge unit 30 rotatably connects the folder 20 to the main body 10, so that the hinge unit 30 can be folded or unfolded. In particular, the hinge unit 30 can be slid together with the folder 20 on the main body 10 by a coupling means, which will be disclosed below. A person of ordinary skill in the art understands and appreciates that the items comprising the hinge unit could be installed in complementary fashion to the exemplary arrangement shown in FIGS. 4 and 5.

Still referring to FIGS. 4 and 5, the hinge unit 30 includes a pair of side hinges. Specifically, the hinge unit 30 typically includes a center hinge 230 formed on the folder 20, a first side hinge 320 connected to one end of the center hinge 230 by a hinge module M1, and a second side hinge 310 connected to the other end of the center hinge 230 by a hinge dummy M2. The hinge unit 30 provides a hinge axis A (FIG. 3) for the folder 20, thereby providing a semi-automatic driving source for opening or closing the folder 20 at an angle in the range of 0 degree (FIG. 1) to 150 degrees. The hinge module M1 provides the hinge axis A and the semi-automatic driving source, while the hinge dummy M2 provides the hinge axis A only. If the folder 20 is coupled to the main body 10 through the hinge module M1 and the hinge dummy M2 (FIG. 5), the first and second hinges 320 and 310, the hinge module M1, and the hinge dummy M2 are arranged along the hinge axis A (FIG. 3).

Figure 6:
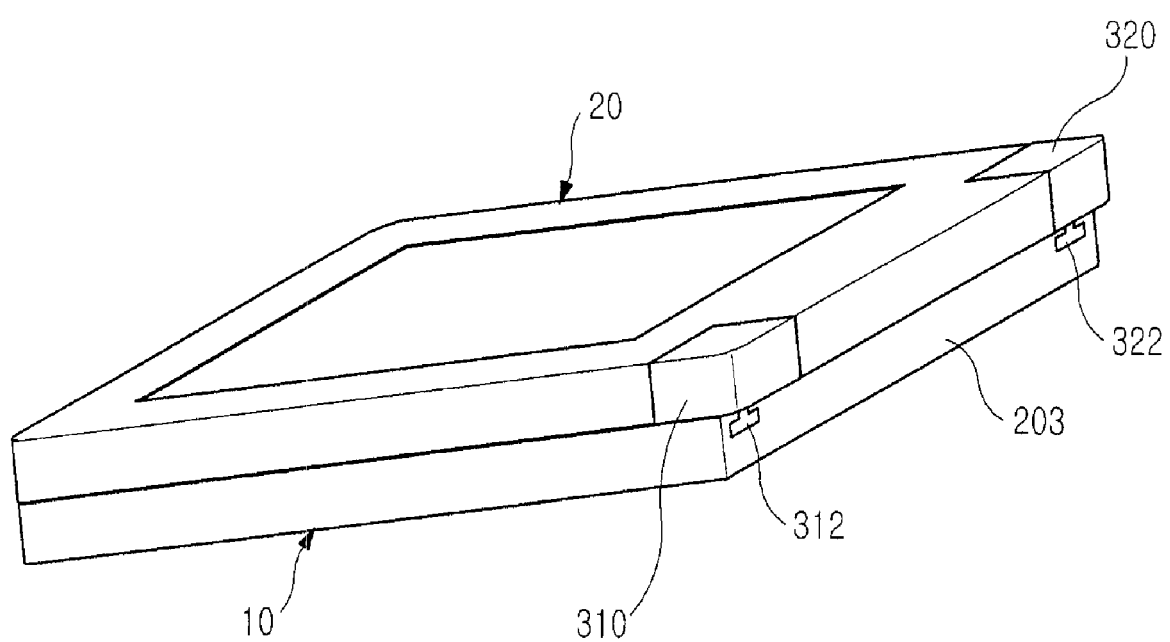
FIG. 6 is a perspective view showing the portable device of FIG. 1 prior to mounting a block.

As shown in FIGS. 5 and 6, coupling means for slidably restraining the hinge unit 30 on the main body 10 are provided between the main body 10 and the hinge unit 30. The coupling means are provided for each of the first and second side hinges 320 and 310 of the hinge unit 30. The coupling means comprises, for example, first and second projections 322 and 312 extending downward from the bottom surface of the first and second side hinges 320 and 310, respectively, and first and second guide openings 132 and 131 formed on the top surface of the main body 101, wherein the first and second projections 322 and 312 are engaged and slide along the first and second guide openings 132 and 131, respectively.

Still referring to FIGS. 5 and 6, each of the first and second projections 322 and 312 is provided with horizontal extending portions at the end parts thereof in order to prevent the first and second projections 322 and 312 from getting out vertically from the first and second guide openings 132 and 131 after being engaged with the first and second guide openings 132 and 131. The first and second guide openings 132 and 131 are linearly formed preferably such that they provide moving paths for the first and second side hinges 320 and 310 and are also used at the time of assembling the first and second side hinges 320 and 310. Preferably, the first and second side openings 132 and 131 are symmetrically and oppositely formed, and thus it follows in that case that the first and second side hinges 320 and 310 are also symmetrically and oppositely mounted along the first and second side openings 132 and 131, respectively, so that the first and second side hinges 320 and 310 slide along the first and second guide openings 132 and 131.

After the first and second side hinges 320 and 310 of the hinge unit are fitted in the first and second guide openings 132 and 131, a separate block 40 is additionally mounted on the top end 203 of the main body (see FIG. 6) so as to prevent the first and second side hinges 320 and 310 from falling/slipping out from the main body 10. FIG. 6 shows the state of a portable device after the first and second hinges 320 and 310 are fitted in the first and second guide openings 132 and 131, respectively, and before the block 40 is attached.

A sensor, not shown in the drawings, may be used for mode-switching effectuated according to the rotating or sliding movement of the folder. A Hall sensor or a magnetic sensor, for example may be employed as the sensor, but an artisan understands and appreciates that other types of sensors (optical, electrical) can also be used. A person skilled in the art will readily understand the mode-switching operation according to the rotation or sliding movement of the folder.

In other examples, a device, e.g., a camera module, may be employed instead of the first display unit 110. If such a camera module is provided instead of the first display unit 110, mode-switching to the camera photographing mode can be effectuated as the folder slides. In such a case, the information input/output unit 220 may serve to display pictures photographed by using the camera module.

Figure 7:
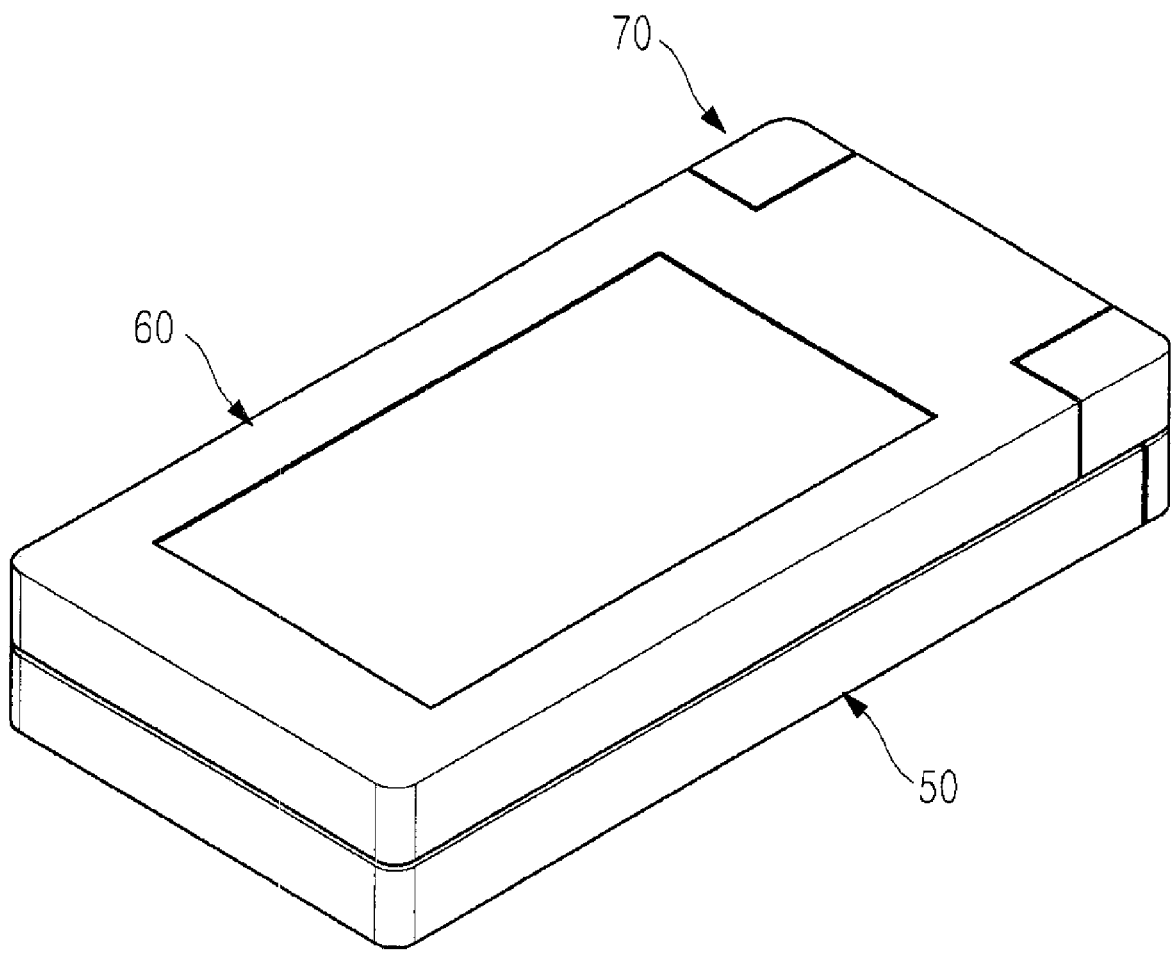
FIG. 7 is a perspective view showing a portable device in accordance with another embodiment of the present invention, in which the folder is folded.
Figure 8:
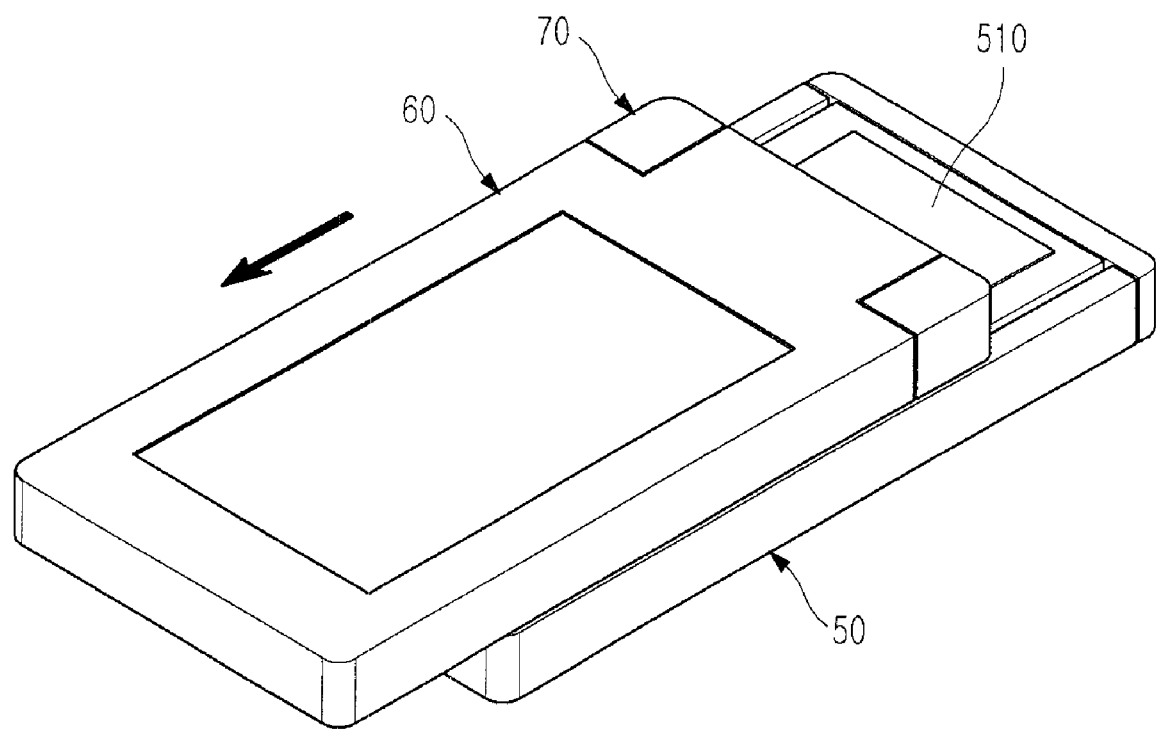
FIG. 8 is a perspective view showing the portable device of FIG. 7, in the state in which the folder is slid.

As shown in FIGS. 7 and 8, the portable device according to another exemplary embodiment of the present invention includes: a main body 50 provided with a speaker 510 on the top surface thereof; a folder 60 capable of being folded or unfolded and slid on/along the main body 50, the folder effecting the first mode-switching when it is folded or unfolded on the main body 50, and the second mode-switching when it is slid on/along the main body 50, the speaker being opened or closed as the folder is slid; a hinge unit 70 mounted on the main body 50 and connecting the folder 60 to the main body 50, the hinge unit 70 sliding on the main body 50 together with the folder 60 in the state in which the folder 60 is opposite to the main body 50; and coupling means mounted between the main body 50 and the hinge unit 70 so that the coupling means slidably restrain the hinge unit 70. The portable device according to the present exemplary embodiment may be provided with a speaker 510 instead of the first display unit 110. As a result, if a user slides down the folder 60, the standby mode is switched into the music listening mode, and the speaker 510 is exposed to the user, whereby the auditory UI environment can be improved. Because the hinge unit 70 and the coupling means are equal to those of the hinge unit and the coupling means of the above-mentioned exemplary embodiments, a detailed description thereof will be omitted.

As disclosed above, the inventive portable is convenient in mode-switching under a multimedia environment providing a plurality of different modes. In particular, according to the present invention, mode-switching from the standby mode to the music listening mode can be conveniently effectuated according to the sliding of the folder. In addition, the mode-switching operation according to the sliding of the folder renders an additional display unit to be opened, whereby the data output environment can be improved. Furthermore, according to the present invention, when the portable device is in the music listening mode due to the sliding of the folder to a position that switches to the music listening mode, the speaker is exposed, whereby the auditory UI environment can be improved.

While the invention has been shown and described with reference to certain exemplary embodiments thereof, it will be understood by those skilled in the art that various changes in form and details may be made therein without departing from the spirit and scope of the invention as defined by the appended claims. For example, while the hinge unit is shown arranged on the main body, it could be arranged on the folder. In addition, it is possible to use something other than a hinge to pivot the folder, such as gears.

What is claimed is:
1. A portable device for multimedia, comprising:
a main body;
a folder slidably disposed on the main body in a substantially planar first position so that an inner surface of the folder faces a top surface of the main body, the folder being pivotally positionable to be spaced away from the main body in a second position by a variable angle;
a connecting unit rotatably connecting the folder to the main body, and a coupling means for coupling together the main body and the connecting unit, wherein the coupling means comprising one or more projections extending downward from a bottom side of the connecting unit; and one or more guide openings formed on the top surface of the main body and being sized to receive the one or more projections, respectively, wherein the projections are slidably mounted in the guide openings, respectively, the connecting unit sliding on the main body together with the folder, and wherein a mode-switching of the portable device being provided according to a position on which the connecting unit is slidably positioned on the main body.

2. The portable device as claimed in claim 1, wherein the connecting unit comprises a hinge unit.

3. The portable device as claimed in claim 2, wherein the hinge unit is mounted on the main body.

4. The portable device as claimed in claim 2, wherein the hinge unit is mounted on the folder.

5. The portable device as claimed in claim 1, wherein the variable angle is obtuse.

6. The portable device as claimed in claim 1, wherein the connecting unit comprises gears.

7. The portable device as claimed in claim 2, wherein the mode-switching includes switching from a standby mode to a music listening mode.

8. The portable device as claimed in claim 2, wherein each mode of a plurality of modes are accessed according to a position of the hinge unit along the main body.

9. A portable device for multimedia, comprising:
a main body having a first display unit and a first key manipulation unit on a top surface thereof;
a folder having a second display unit on an inner surface thereof, the folder being variably positioned ranging from a completely folded position to a completely unfolded on the main body, and the folder slidably disposed on the main body, wherein a position of the folder relative to the main body effecting mode-switching to at least one mode;
a hinge unit mounted pivotally connecting the folder to the main body, and
a coupling means for coupling together the main body and the hinge unit,
wherein the coupling means comprising one or more projections extending downward from a bottom side of the hinge unit; and one or more guide openings formed on the top surface of the main body and being sized to received the one or more projections, respectively, wherein the projections are slidably mounted in the guide openings, respectively, so that the hinge unit slides on the main body together with the folder in a substantially planar position in which the inner surface of the folder faces the top surface of the main body.

10. The portable device as claimed in claim 9, wherein the first display unit is mounted at a side of the hinge unit in an upper area of the top surface of the main body, so that the first display unit is opened or closed depending on the sliding movement of the folder.

11. The portable device as claimed in claim 10, wherein the hinge unit further comprises a retaining block, the retaining block being mounted on the upper end of the top surface of the main body after the hinge unit is coupled to the main body, said retaining block preventing the hinge unit from becoming uncoupled from the main body.

12. The portable device as claimed in claim 9, further comprising an information input/output unit arranged on an outer surface of the folder, wherein the information input/output unit is formed by a touch screen.

13. A portable device for multimedia, comprising:
a main body having a display unit on a top surface thereof;
a folder, the folder being variably positioned ranging from a completely folded to a completely unfolded position on the main body, thereby effecting first mode-switching, and the folder sliding on the main body, wherein a position of the folder relative to the main body effecting second mode-switching, the display unit being opened or closed depending on the sliding movement of the folder;
a hinge unit mounted connecting the folder to the main body, the hinge unit sliding on the main body together with the folder in a substantially planar position in which the inner surface of the folder faces the top surface of the main body; and
coupling means mounted between the main body and the hinge unit for slidably restraining the hinge unit, the coupling means comprising one or more projections extending downward from a bottom side of the hinge unit; and one or more guide openings formed on the top surface of the main body and being sized to receive the one or more projections, respectively, wherein the projections are slidably mounted in the guide openings, respectively.

14. The portable device as claimed in claim 13, wherein the hinge unit comprises: a center hinge formed on the folder; a first side hinge coupled to one end of the center hinge by a hinge module, and a second side hinge coupled to the other end of the center hinge by a hinge dummy.

15. A portable device for multimedia comprising:
a main body having a speaker on a top surface thereof;
a folder, the folder being variably positioned ranging from a completely folded to a completely unfolded position on the main body, wherein a position of the folder relative to the main body for effecting first mode-switching, and the folder sliding on the main body such that an inner surface of the folder faces the top surface of the main body and slidably moves over the top surface of the main body for effecting second mode-switching simultaneously with the speaker ranging from an closed position where the folder covers the speaker, to an opened position where, due to sliding movement of the folder, the speaker is not covered by the folder;
a hinge unit mounted on the main body and connecting the folder to the main body, the hinge unit sliding on the main body together with the folder in a substantially planar position in which the folder faces the top surface of the main body; and
coupling means mounted between the main body and the hinge unit in for slidably restraining the hinge unit, the coupling means comprising one or more projections extending downward from a bottom side of the hinge unit; and one or more guide openings formed on the top surface of the main body and being sized to received the one or more projections, respectively, wherein the projections are slidably mounted in the guide openings, respectively.

16. The portable device as claimed in claim 15, wherein by the first mode-switching, the portable device is switched from a standby mode to a music listening mode, thereby exposing the speaker.

17. The portable device as claimed in claim 15, wherein the main body includes a first display unit.

18. The portable device as claimed in claim 17, wherein by the second mode-switching, the portable device renders an additional display unit to be opened.

* * * * *

UNITED STATES PATENT AND TRADEMARK OFFICE
CERTIFICATE OF CORRECTION

| | | |
|---|---|---|
| PATENT NO. | : 8,275,425 B2 | Page 1 of 1 |
| APPLICATION NO. | : 12/551647 | |
| DATED | : September 25, 2012 | |
| INVENTOR(S) | : Dong-Hoon Han et al. | |

It is certified that error appears in the above-identified patent and that said Letters Patent is hereby corrected as shown below:

In the Claims:

Column 7, Claim 9, Lines 45-46 should read as follows:
--...sized to receive the one or more...--

Column 8, Claim 15, Line 54 should read as follows:
--...sized to receive the...--

Signed and Sealed this
Thirtieth Day of April, 2013

Teresa Stanek Rea
*Acting Director of the United States Patent and Trademark Office*